United States Patent
Lee et al.

(10) Patent No.: US 9,727,170 B2
(45) Date of Patent: Aug. 8, 2017

(54) METHOD OF REMOVING COMMON NOISE AND METHOD OF DETECTING TOUCH INFORMATION

(71) Applicant: Anapass Inc., Seoul (KR)

(72) Inventors: Jong Hwa Lee, Seoul (KR); Woo Hyoung Seo, Seoul (KR); Ha Sun Song, Seoul (KR)

(73) Assignee: ANAPASS INC., Seoul (KR)

( * ) Notice: Subject to any disclaimer, the term of this patent is extended or adjusted under 35 U.S.C. 154(b) by 93 days.

(21) Appl. No.: 14/504,491

(22) Filed: Oct. 2, 2014

(65) Prior Publication Data
US 2015/0103042 A1   Apr. 16, 2015

(30) Foreign Application Priority Data
Oct. 15, 2013  (KR) ......................... 10-2013-0122720

(51) Int. Cl.
*G06F 3/041* (2006.01)
(52) U.S. Cl.
CPC ................................ *G06F 3/0418* (2013.01)

(58) Field of Classification Search
CPC ........................... G06F 3/0418; G06F 3/0488
See application file for complete search history.

(56) References Cited

U.S. PATENT DOCUMENTS

| | | | |
|---|---|---|---|
| 7,920,129 B2 | 4/2011 | Hotelling et al. | |
| 2011/0261007 A1* | 10/2011 | Joharapurkar | G06F 3/0418 345/174 |
| 2012/0056851 A1* | 3/2012 | Chen | G06F 3/0418 345/174 |
| 2012/0139868 A1* | 6/2012 | Mamba | G06F 3/044 345/174 |

* cited by examiner

*Primary Examiner* — Michael Faragalla
*Assistant Examiner* — Chayce Bibbee
(74) *Attorney, Agent, or Firm* — Paratus Law Group, PLLC (57) ABSTRACT

Provided are a method of removing common noise and a method of detecting touch information. The method of removing common noise includes acquiring base lines, acquiring raw data, calculating touch strengths (TSs) using the base lines and the raw data, calculating a difference representative value between the TSs and a reference level, and removing influence of common noise from the TSs using the difference representative value.

18 Claims, 7 Drawing Sheets

METHOD OF REMOVING COMMON NOISE AND METHOD OF DETECTING TOUCH INFORMATION

CROSS-REFERENCE TO RELATED APPLICATION

This application claims priority to and the benefit of Korean Patent Application No. 2013-0122720, filed on Oct. 15, 2013, the disclosure of which is incorporated herein by reference in its entirety.

BACKGROUND

1. Field of the Invention

The present invention relates to a method of removing common noise and a method of detecting touch information.

2. Discussion of Related Art

Currently, resistive touch screens, surface acoustic wave (SAW) touch screens, and capacitive touch screens are mainly in use. Capacitive touch screens are capable of sensing multiple touches and have excellent durability, sensibility, and so on. Therefore, there is a current trend toward adopting capacitive touch screens as the major input units of mobile devices.

A capacitive touch screen senses a change in the amount of charge caused by a user's interference in capacitive sensors on a touch screen panel, thereby recognizing the user's input. Capacitive touch screens are classified into a self-capacitive type and a mutual-capacitive type according to charge accumulation methods. In a self-capacitive touch screen, each capacitive sensor constitutes one electrical conductor and forms electrified surfaces together with a reference ground surface outside a touch screen panel. On the other hand, in a mutual-capacitive touch screen, two electrical conductors on a touch screen panel form electrified surfaces and function as one capacitive sensor.

A general self-capacitive touch screen employs an orthogonal X/Y disposition of electrical conductors, and in this case, each capacitive sensor functions as a line sensor. Therefore, every time the touch screen attempts to sense a touch, only one piece of X-sensing information and one piece of Y-sensing information are provided by an X-line sensor group and a Y-line sensor group, respectively. For this reason, the general self-capacitive touch screen is capable of sensing and tracking a single touch but incapable of supporting multiple touches. A mutual-capacitive touch screen also employs an orthogonal X/Y disposition of electrical conductors, but is different from the self-capacitive touch screen in that each capacitive sensor is configured in the form of a grid sensor at every position where electrical conductors cross at right angles and responses of all grid sensors are separately sensed upon attempting to detect a user's input on the touch screen. Since the respective grid sensors correspond to different X/Y coordinates and provide separate responses, in the mutual-capacitive touch screen, a user's input information may be extracted from an X/Y-sensing information set provided by an X/Y grid sensor set, and the user's multiple touches may be sensed and tracked.

A general mutual-capacitive touch screen panel has the following electrical conductor configuration and sensing method. First electrodes consisting of electrical conductors extending in any one direction and second electrodes consisting of electrical conductors extending in a direction crossing the first electrodes at right angles form mutual-capacitive sensors with a dielectric material interposed between the first electrodes and the second electrodes. When a distance between a first electrode and a second electrode is d, an area of electrified surfaces is a, and the equivalent permittivity of all dielectric materials between the electrified surfaces is $\in$, a capacitance C of each sensor is defined as $C=\in*a/d$, and an amount Q of charge accumulated in the sensor and a potential difference (voltage) V applied to two electrodes/electrified surfaces has a relationship of $Q=CV$. When a user approaches a sensor, interference occurs in an electric field formed between two electrodes and disturbs the accumulation of charge in the sensor. Then, the amount of charge accumulated in the sensor decreases, and as a result, capacitance is reduced. This may be understood as a change in capacitance resulting from a change in the equivalent permittivity between the electrified surfaces caused by the user's approach, but is actually a physical phenomenon in which a part of the electric field between the electrified surfaces is shunted due to the user's approach and the accumulated charge is reduced. When an alternating current (AC) waveform is applied to one electrified surface of a sensor by connecting an AC voltage source to the first electrode, a change $\Delta Q$ in the amount of charge corresponding to $\Delta Q=C\Delta V$ occurs with respect to C that is changed according to the degree of a user's approach, and a read-out circuit connected to the second electrode converts the change $\Delta Q$ into current or voltage. Information converted in this way is generally subjected to signal processing operations, such as noise filtering, demodulation, digitizing, and accumulation, and then used in a coordinate tracking algorithm and a gesture recognition algorithm. U.S. Pat. No. 7,920,129 discloses such a capacitive touch sensitive panel.

SUMMARY OF THE INVENTION

A touch panel may be used in various environments, and several kinds of noise are applied according to the environments in which the touch panel is used. In other words, several kinds of noise, such as noise generated by a fluorescent lamp which is a generally used light, noise generated by a huge lighting fixture used in a shooting site, and noise emanated from a high-voltage source in a subway station, are applied through a touch panel. When a user makes a touch in such a situation, noise collected through the user's body is applied to the touch panel through a finger, etc. with which the touch is made.

In addition, in electronic devices, such as a cellular phone and a tablet personal computer (PC) having a display disposed under a touch panel, noise emanated from the display affects all sensing electrodes of the touch panel. According to the related art, a shielding layer is formed on a surface of the touch panel that faces the display, or driving electrodes to which no driving signal is applied are electrically connected to a low-impedance source, so that application of noise emanated from the display to the touch panel may be prevented as much as possible.

However, common noise which affects all channels of a touch panel in common may not be blocked but may be applied as it is to a touch sensing device, for example, when driving electrodes and sensing electrodes forming the touch panel are formed on one surface of a substrate and the lower surface of the substrate is not subjected to a shielding process so as to manufacture the touch sensing device to be thin at a low cost, the touch panel is formed in a display device as an in-cell type touch panel or an on-cell type touch panel, or noise affecting all the channels of the touch panel is applied from an environment in which the touch sensing device is used. In this case, it is difficult to detect touch information.

The present invention is directed to providing a method for effectively removing common noise which is applied to all channels in common so as to detect touch information.

The present invention is also directed to providing a touch information detection method for improving the accuracy of detection of touch information by effectively removing noise that is applied to all channels in common.

According to an aspect of the present invention, there is provided a method of removing common noise, the method including: acquiring base lines; acquiring raw data; calculating touch strengths (TSs) using the base lines and the raw data; calculating a difference representative value between the TSs and a reference level; and removing influence of common noise from the TSs using the difference representative value.

According to another aspect of the present invention, there is provided a method of detecting touch information, the method including: detecting a TS calculation reference level when there is no touch input; detecting touch signals; calculating TSs using the touch signals and the TS calculation reference level; calculating a difference representative value by calculating a difference between a common noise calculation reference level and the TSs; and removing influence of common noise from the TSs using the difference representative value.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Specific structural and functional details disclosed herein are merely representative for purposes of describing the exemplary embodiments of the present invention, and the present invention may be embodied in many alternate forms and should not be construed as limited to the exemplary embodiments of the present invention set forth herein. Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

The terminology used in this specification should be understood as follows.

The terms "first," "second," etc. are used to describe various elements. However, the scope of the present invention should not be limited by these terms since these terms are only used to distinguish one element from other elements. For example, a first element could be termed a second element, and vice versa.

It will be understood that when an element is referred to as being "on" or "above" another element, it can be directly on or above the other element, or intervening elements may also be present. On the other hand, it will be understood that when an element is referred to as being "in contact with" another element, there is no intervening element. Meanwhile, other terms for describing relationships between elements, that is, "interposed between" and "directly interposed between," "between" and "directly between," "adjacent to" and "directly adjacent to," etc., will be understood in the same way.

The singular forms "a," "an," and "the" are intended to include the plural forms as well, unless the context clearly indicates otherwise. It will be further understood that the terms "comprise," "include," and "have," when used herein, specify the presence of stated features, integers, steps, operations, elements, parts, or combinations thereof, but do not preclude the presence or addition of one or more other features, integers, steps, operations, elements, parts, or combinations thereof.

It should also be noted that in some alternative implementations, the functions/operations noted in the blocks may occur out of the order noted in the flowcharts. For example, two blocks shown in succession may in fact be executed substantially concurrently or the blocks may sometimes be executed in the reverse order, depending upon the functionality/operations involved.

In reference drawings for describing exemplary embodiments of the present disclosure, size, height, thickness, etc. are intentionally exaggerated for convenience of description and ease of understanding, but are not enlarged or reduced according to a ratio. Also, in the drawings, some elements may be intentionally reduced, and other elements may be intentionally enlarged.

Unless otherwise defined, all terms used herein have the same meaning as commonly understood by those of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
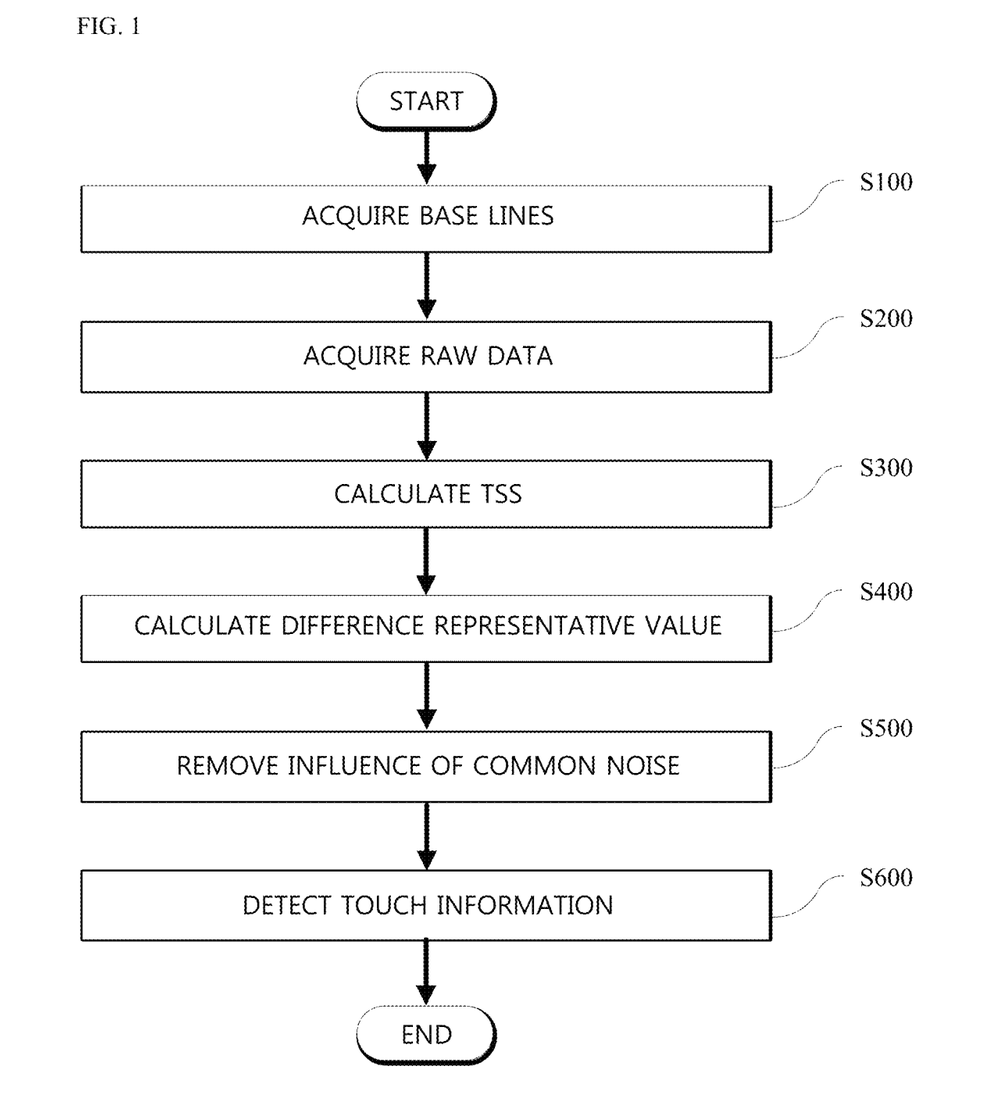
FIG. 1 is a diagram showing the overview of an exemplary embodiment of the present invention in the form of a flowchart.
Figure 2:
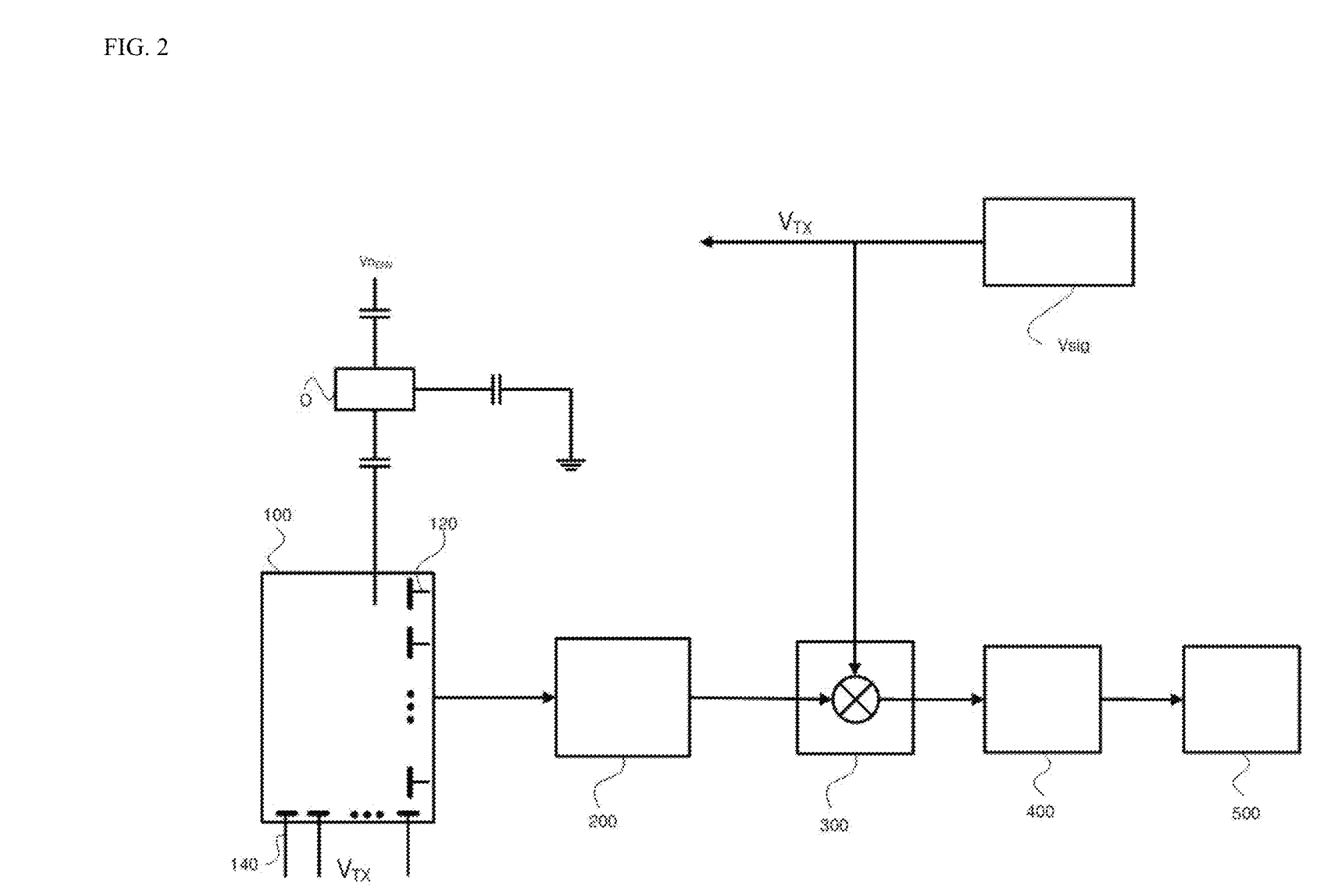
FIG. 2 is a block diagram schematically showing the constitution of a touch sensing device according to the exemplary embodiment.
Figure 3:
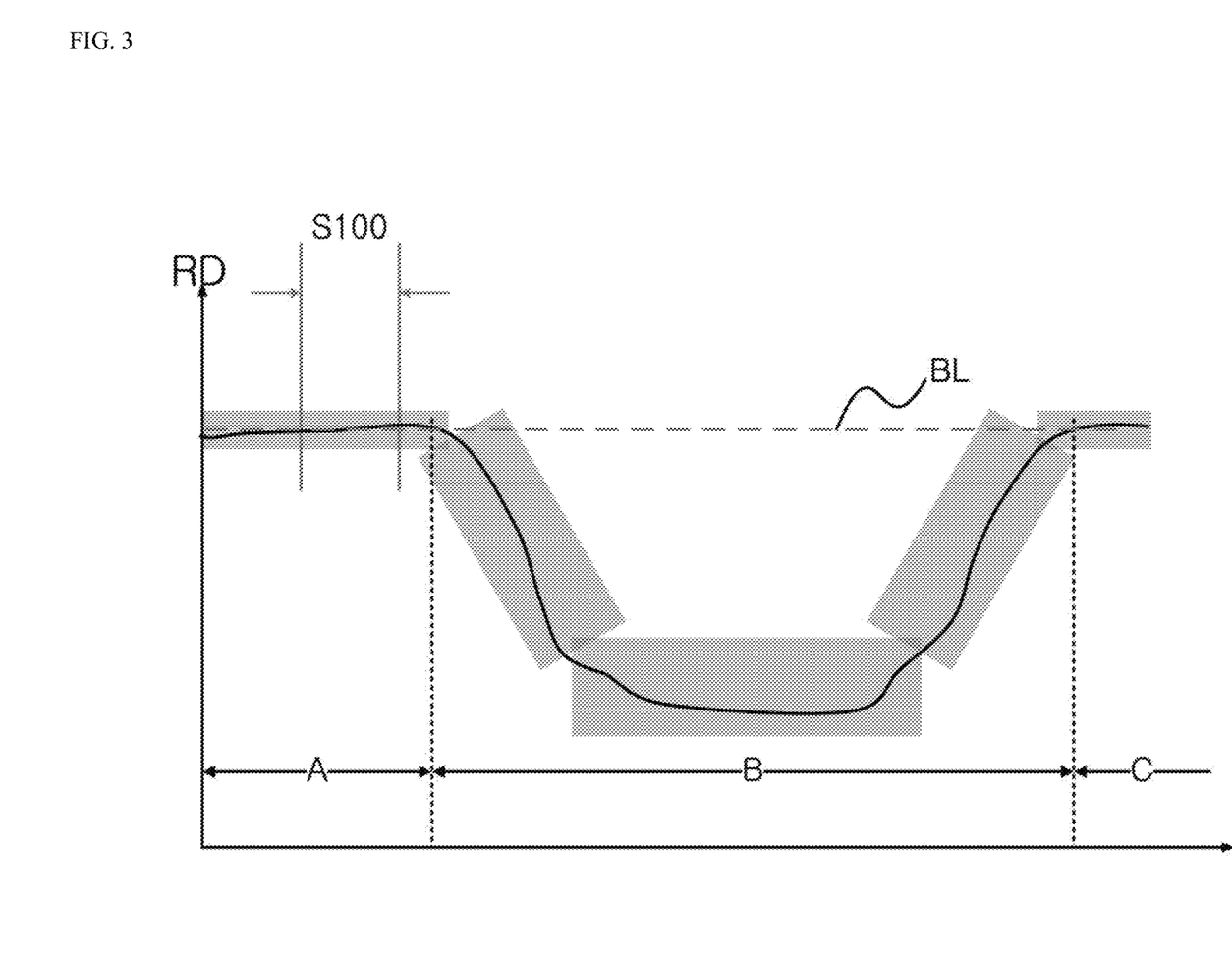
FIG. 3 is a diagram schematically showing a change in a signal output by one sensor node over time when no touch is made by an object and a touch is made by an object.

Hereinafter, exemplary embodiments of the present invention will be described with reference to accompanying drawings. FIG. 1 is a diagram showing the overview of an exemplary embodiment of the present invention in the form of a flowchart, and FIG. 2 is a block diagram schematically showing the constitution of a touch sensing device according to the exemplary embodiment. FIG. 3 is a diagram schematically showing a change in a signal output by one sensor node over time when no touch is made by an object and a touch is made by an object.

Referring to FIG. 1, a method of removing common noise according to this exemplary embodiment of the present invention includes an operation of acquiring base lines, an operation of acquiring raw data, an operation of calculating touch strengths (TSs) using the base lines and the raw data, an operation of calculating a difference representative value between the TSs and a reference level, and an operation of removing influence of common noise from the TSs using the difference representative value.

Also, a method of detecting touch information according to an exemplary embodiment of the present invention includes an operation of detecting a TS calculation reference level when there is no touch input, an operation of detecting touch signals, an operation of calculating TSs using the touch signals and the TS calculation reference level, an operation of calculating a difference representative value by calculating a difference between a common noise calculation reference level and the TSs, and an operation of removing influence of common noise from the TSs using the difference representative value. In addition, according to an exemplary embodiment of the present invention, after the common noise is removed, touch information may be detected by processing the TSs from which the difference representative value has been removed.

Referring to FIGS. 1 to 3, in S100, base lines are acquired. A base line is a value obtained by performing predetermined processing on a signal output by a sensing electrode 120 when a signal source Vsig applies a driving signal $V_{TX}$ for driving a touch panel 100 to a driving electrode 140 but an object O does not touch the touch sensing device. The base line may be a reference level for calculating a TS. In other words, a base line is obtained by processing the output value of a sensor when no touch has been made, and is acquired in an idle mode in which the object O does not touch the touch panel 100 and the touch sensing device waits for a touch input from the object O.

In this specification, an entity with which a user is able to apply an input to a touch panel is defined as an "object." Such an object denotes an entity that may shunt electric field flux formed between a driving electrode and a sensing electrode and apply a touch input to the touch panel 100, such as a finger, a palm, or a stylus. However, these are merely intended for description of an object and not intended to limit the range of an object. Therefore, an object may be any entity capable of applying a touch input to a touch panel, such as a user's cheek or toe in addition to the aforementioned finger, palm, or stylus.

Referring to FIG. 3, a signal output by a sensor in a period A before the object O touches a sensor is obtained through superposition of solid line components formed by applying the driving signal $V_{TX}$ to the touch panel 100 and noise components (grey box) applied to the touch panel 100. Therefore, a base line BL is a value obtained by performing processing on a signal obtained through superposition of noise components and signal components formed by applying the driving signal $V_{TX}$ when no touch is made.

Noise applied to the touch panel 100 has a random amplitude, frequency, and phase, and thus is shown as grey boxes for ease of understanding and convenience of illustration. However, the grey boxes indicate none of the amplitude, the envelope, the phase, and the frequency of a signal obtained through superposition of the noise and the sensor output. In other words, the grey boxes do not indicate that the signal obtained through superposition of the noise and the output signal of the sensor is in the grey boxes, but denote that the output signal of the sensor is superimposed by relatively small or large noise. To indicate that the magnitude of noise applied from the outside is relatively small or large, the widths of grey boxes may be shown to be different as described below.

In a period B, the sensor senses a touch of the object O and outputs a touch signal. A user's body works as an antenna for noise to collect noise, and the collected noise is applied to the touch panel 100 through the object O that makes the touch. In other words, the magnitude of noise applied to the sensor upon sensing of the touch is larger than that of noise applied when no touch is made. Therefore, the widths of grey boxes indicating noise applied to the touch sensor in the period B in which the touch has been made are shown to be larger than those of grey boxes in the period A and a period C in which no touch has been made.

It is possible to acquire a base line by performing the following processing on a signal output by a sensing electrode 120 of the sensor node. The signal output by the sensing electrode 120 is a current signal modulated by the frequency of the driving signal $V_{TX}$, and thus is converted into a predetermined voltage signal by a signal conversion unit 200. A demodulator 300 demodulates the voltage signal converted by the signal conversion unit 200 to down-convert the voltage signal. An analog-to-digital converter (ADC) 400 converts the down-converted signal into a digital signal, and an accumulator 500 accumulates the converted digital signal. As another example, although not shown in the drawing, the signal converted by the signal conversion unit 200 may be converted into a digital signal. The digital signal may be down-converted in the digital domain, and the accumulator 500 may accumulate the down-converted signal. As still another example, although not shown in the drawing, the signal conversion unit 200 itself may output a down-converted signal without using the demodulator 300, and the signal output by the signal conversion unit 200 may be digitized and accumulated.

In an exemplary embodiment, although not shown in the drawing, the average of accumulation results of a predetermined time may be calculated and set as a base line. According to this exemplary embodiment, as the average corresponding to the predetermined time is calculated, the magnitude of noise components is averaged out, and a sensor value corresponding to the solid line of FIG. 3 is obtained.

In the idle mode, the touch sensing device acquires sensor-specific base lines at predetermined intervals, and updates sensor-specific base lines with newly acquired base lines. As an example, when the temperature or the humidity of an environment in which the touch sensing device is located is changed according to a change in place or time, even if no touch is made by the object O, the average output value of sensors may be changed, and the accuracy of touch sensing may be lowered. Therefore, the touch sensing device acquires base lines at the predetermined intervals and updates old base lines, thereby improving the accuracy of detection of touch information according to a change in the environment.

Figure 4:
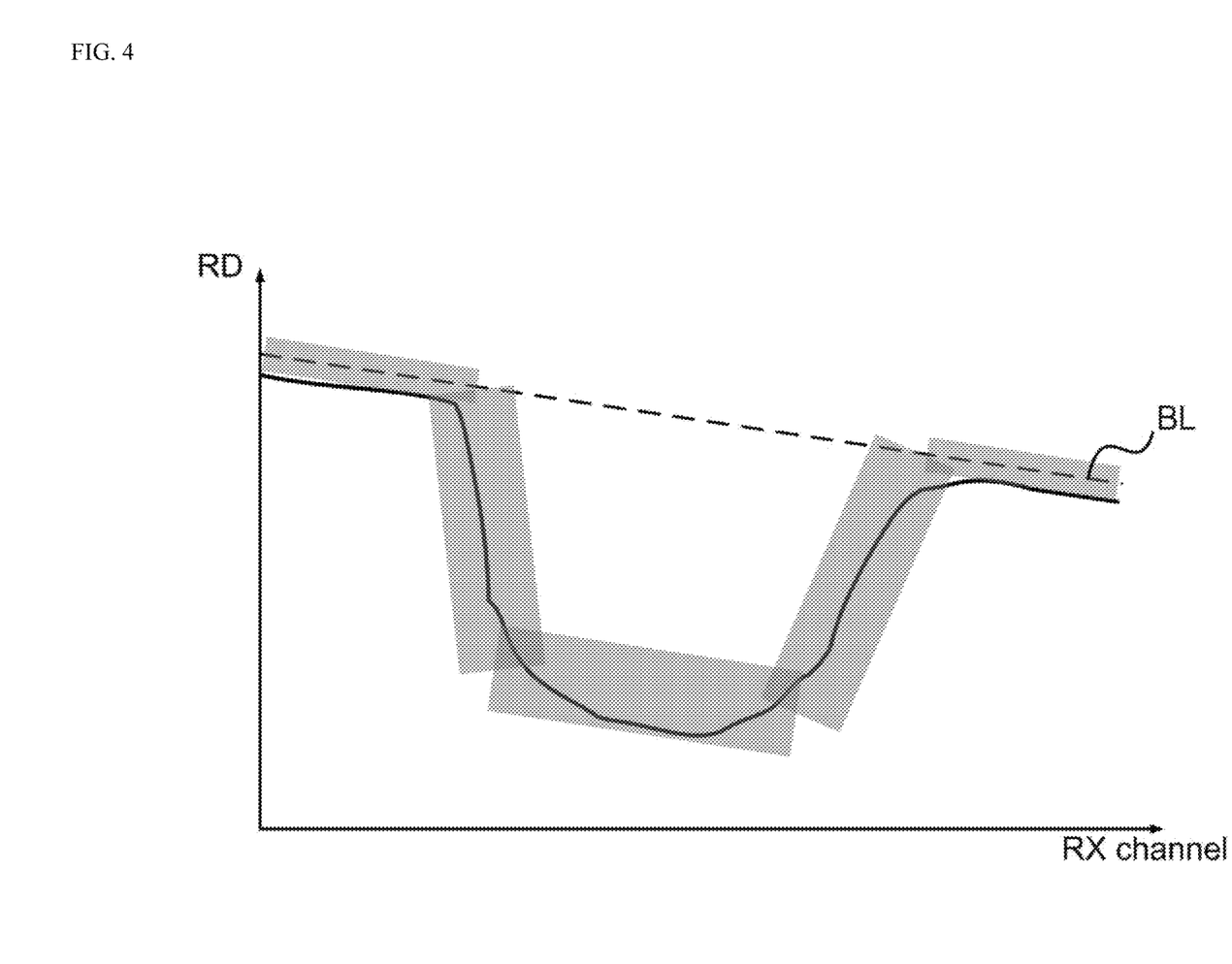
FIG. 4 is a graph showing raw data values of many sensor nodes.

Referring to FIGS. 1, 3, and 4, in S200, raw data is acquired. The raw data is an output value of each sensor corresponding to the TS of the object O or whether or not a touch has been made by the object O, and denotes a value acquired before predetermined digital processing, such as interpolation, that is, a composite operation for processing respective sensor values in connection with each other, is performed. Signals output by the sensors result from the driving signal $V_{TX}$ applied by the signal source Vsig to the driving electrodes 140 of the touch panel 100, and are obtained through superposition of a touch signal containing touch information of the object O and noise components, such as environmental noise and touch noise.

Signal processing performed in this operation is the same as described in S100. As an example, a signal output by the touch panel 100 is converted, and then demodulated to be down-converted. The down-converted signal is digitized and accumulated, so that raw data may be obtained. As another example, although not shown in the drawing, the signal converted by the signal conversion unit 200 may be converted into a digital signal. The digital signal may be down-converted in the digital domain, and the accumulator 500 may accumulate the down-converted signal to acquire raw data. As still another example, although not shown in the drawing, the signal conversion unit 200 itself may output a down-converted signal without using the demodulator 300, and the signal output by the signal conversion unit 200 may be digitized and accumulated to acquire raw data. It is also possible to reduce the magnitude of noise components by calculating the average of accumulation results of a predetermined time.

In FIG. 3 and subsequent figures, the widths of grey boxes indicating noise when a touch is made are shown to be larger than those of grey boxes when no touch is made.

FIG. 4 is a graph showing raw data values of many sensor nodes. While FIG. 3 shows a value output by one sensor over time, FIG. 4 shows signals output by many sensor nodes in a moment. Referring to FIG. 4, a solid line indicates raw data values of a moment, and a dotted line indicates base lines BL acquired according to the sensor nodes in S100. In FIG. 4, the solid line is inclined due to sensor-specific mismatches. The plurality of driving electrodes 140, a dielectric substrate, the sensing electrodes 120, and transmission lines included in the touch panel 100 are not ideal. During a process in which the driving signal $V_{TX}$ is applied to the driving electrodes 140 through transmission lines and signals output by the sensing electrode 120 sensing whether or not a touch has been made by the object O are applied to the signal conversion unit 200 through transmission lines, resistor-capacitor (RC) characteristics of a signal path varies according to the positions of the sensor nodes 120 in the touch panel 100. Also, during a process of forming the touch panel 100, it is not possible to form the driving electrodes 140 and the sensing electrodes 120 to be completely identical. Therefore, the dielectric substrate on which the electrodes are formed may not have a uniform thickness, etc., and there may be a difference in capacitance and so on. Results of several non-ideal characteristics including those mentioned above are referred to as mismatches, and values output by the sensor nodes are different according to sensors due to such mismatches. In FIG. 4, the base lines BL shown as the dotted line denote that the values output by the sensor nodes are different due to such mismatches.

Figure 5:
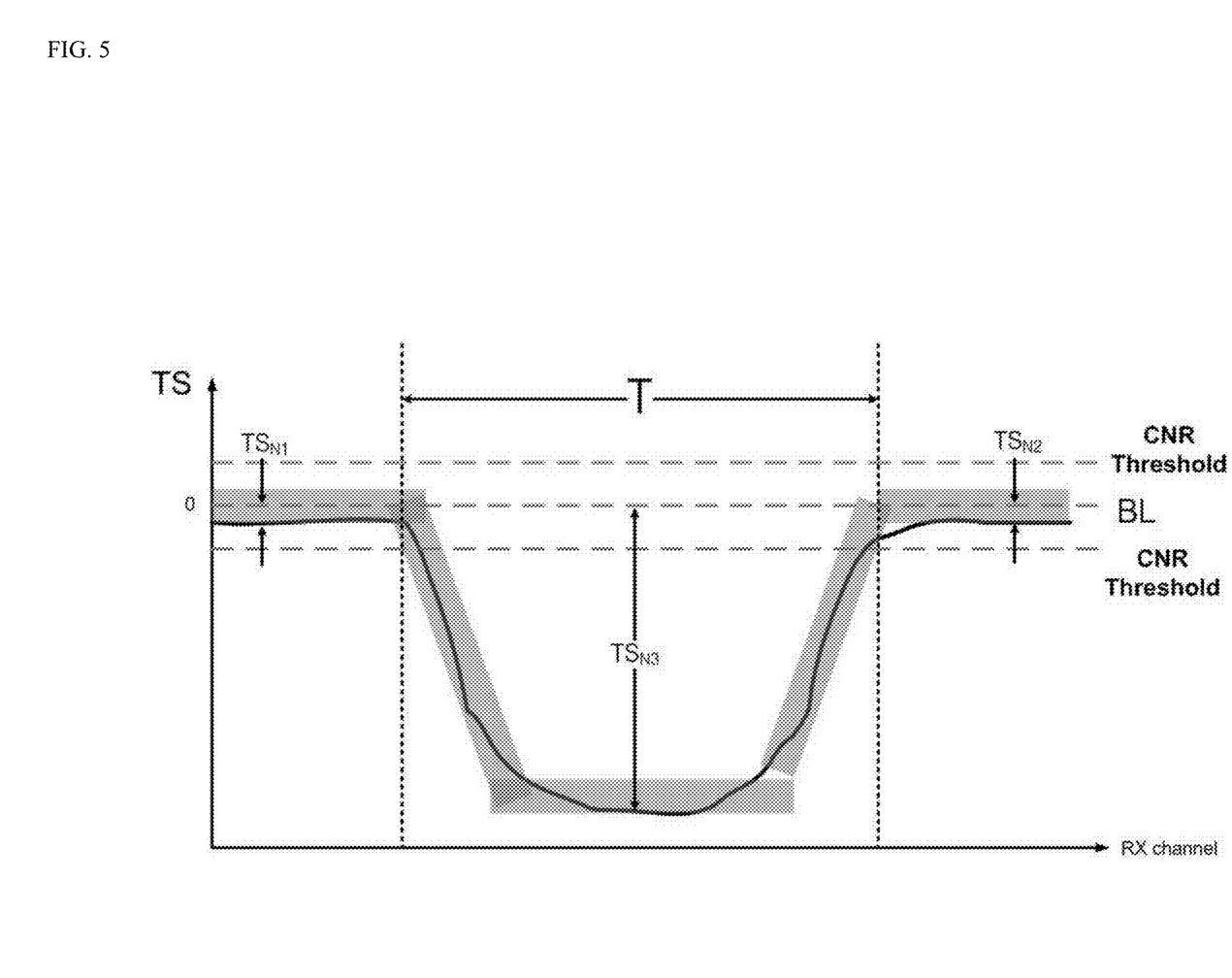
FIG. 5 is a diagram showing acquired touch strengths (TSs)

FIG. 5 is a diagram showing TSs acquired in a moment. Referring to FIGS. 1 and 5, in S300, TSs are acquired. The TSs are acquired by calculating differences between the acquired raw data and the base lines BL. In FIG. 4 showing raw data acquired according to sensors, the raw data graph is inclined in one direction due to mismatches. On the other hand, in FIG. 5, TSs are differences between the raw data including influence of the mismatches and the base lines BL including the same influence of the mismatches, and thus the influence of the mismatches is removed. In other words, the mismatches have the same influence upon the acquisition of the base lines BL and the acquisition of the raw data, and the influence of the mismatches is removed in the process of calculating the differences between the base lines BL and the raw data to calculate the TSs. Therefore, the TS graph shown in FIG. 5 has a horizontal shape compared to the raw data graph of FIG. 4.

In both S100 and S200, the predetermined processing is performed to reduce influence of noise. However, due to random characteristics of noise, different influences of noise may be present in the base lines BL and the raw data in spite of the predetermined processing. Therefore, even when the differences between the raw data and the base lines BL are calculated in the process of calculating the TSs, influences of noise may not be removed but may remain in results of the calculation.

In the amount of change caused by the noise, the amount of change caused by common noise which affects all the sensors in common separates the touch signals of all the sensors from the base lines BL by similar distances as indicated by a solid line in FIG. 5 when the raw data of the sensors are read in a moment.

In other words, the base line of a sensor node that senses no touch and raw data acquired from the sensor node have similar touch signal components, and thus the TS at the sensor node should come close to 0. However, common noise affects all the sensors in common in a moment, and thus also separates the touch signal of a sensor whose TS should come close to its base line BL because no touch is actually made, from the base line. Therefore, TSs $TS_{N1}$ and $TS_{N2}$ of sensors that have sensed no touch are separated from their base lines BL by similar distances.

In S400, a difference representative value between TSs and a reference level is calculated. The reference level is a reference for performing a process of quantitatively calculating influence of common noise and removing the common noise. Therefore, the reference level is used to calculate common noise. As an example, a base line level at which TSs are 0 may be set as the reference level. In other words, when there is no influence of noise, raw data output by a sensor node at which no touch has been made is the same as a base line BL of the sensor node, and thus the TS at the sensor node is 0. Therefore, a common noise component magnitude reference point based on which it is possible to determine the degree of influence of common noise may be set to the base line level at which TSs are 0. As another example, the reference level may be one value of TS within a range from −20% to 20% of the base line BL. In other words, when the base line is B, the reference level may be set to any one value of TS within a range from −0.2 B to 0.2 B (i.e., any one value of raw data within a range from 0.8 B to 1.2 B).

In an exemplary embodiment of setting the reference level, preparatory reference levels are determined at different predetermined ratios, such as 5%, 10%, and 15%, of a base line, and any one of the preparatory reference levels is selected according to an environment of the touch sensing device and is set and used as the reference level.

Differences between the reference level set in this way and the TSs of several sensor nodes are calculated, and a difference representative value is calculated. In an exemplary embodiment, differences between the reference level set and TSs acquired in the previous operation at several sensing electrodes simultaneously driven by one driving electrode are obtained, and any one of the minimum value, the maximum value, the arithmetic mean, the geometric average, the weighted average, the median value, and the mode value of the obtained differences is calculated and set as the difference representative value. When a TS is a channel value that exceeds a common noise threshold, the TS is determined not to have been affected by common noise and is excluded from difference representative value calculation targets.

For example, referring to FIG. 5, when a reference level is the base line level at which a TS is 0, a TS $TS_{N3}$ at any one node in an area T in which a touch has been made is larger than TSs $TS_{N1}$ and $TS_{N2}$ at other nodes in areas in which no touch has been made. Therefore, when the TS $TS_{N3}$ in the area in which a touch has been made is included in the calculation of a difference representative value, influence of the touch is included in the difference representative value as well as influence of common noise.

For this reason, a common noise reduction (CNR) threshold is determined from the reference level so that a change in TS which has not been caused by common noise is not included in the calculation of a difference representative value. When the change in TS exceeds the CNR threshold, it is determined that the TS has been changed by influence of something other than common noise, and the differences of sensor nodes included in the area T are not included in the calculation of a difference representative value. For example, $TS_{N1}$ and $TS_{N2}$ shown in FIG. 5 are included in the calculation of a difference representative value, but $TS_{N3}$ exceeds the CNR threshold and thus is not included in calculation of a difference representative value.

Figure 6:
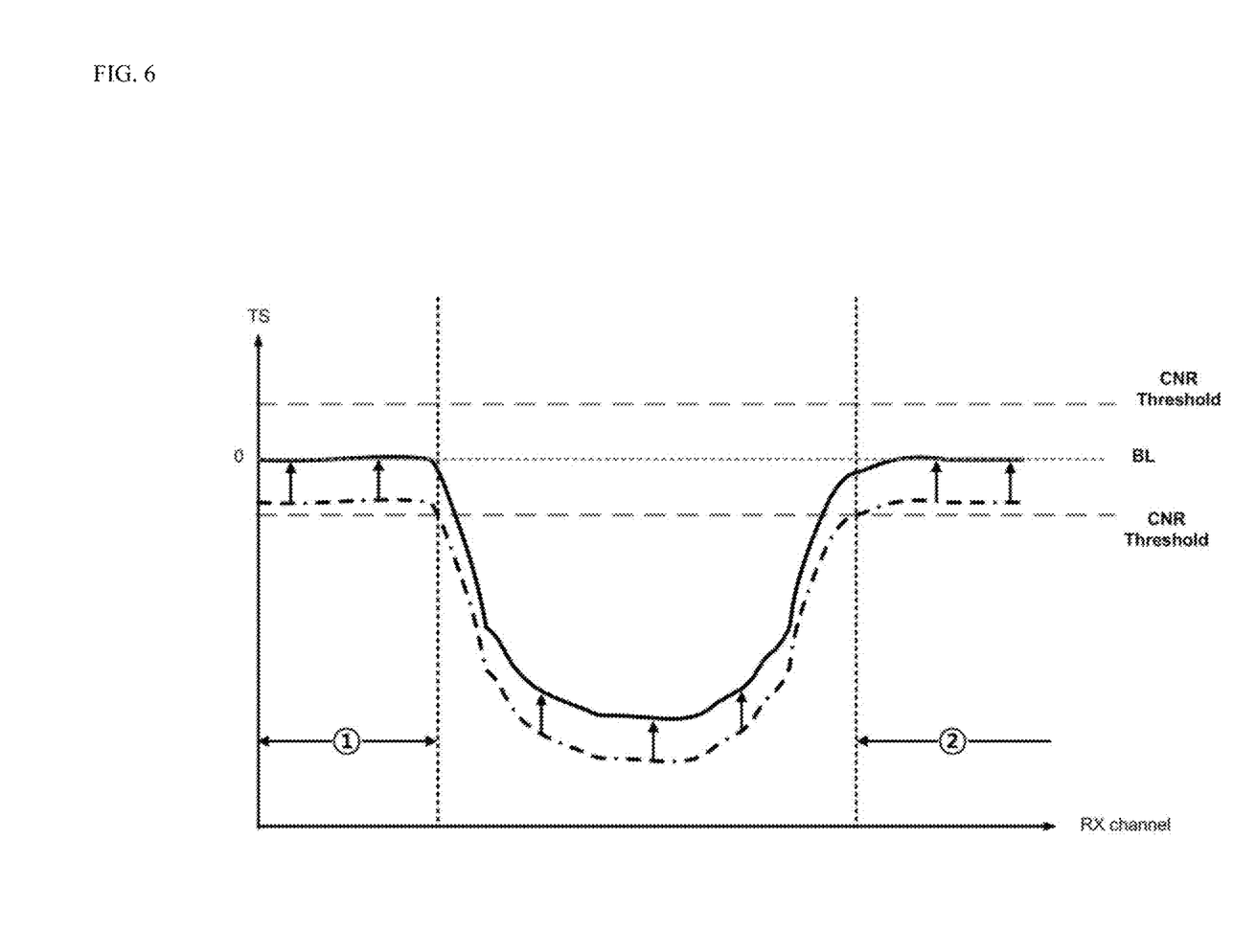
FIGS. 6 and 7 are diagrams illustrating removal of common noise.
Figure 7:
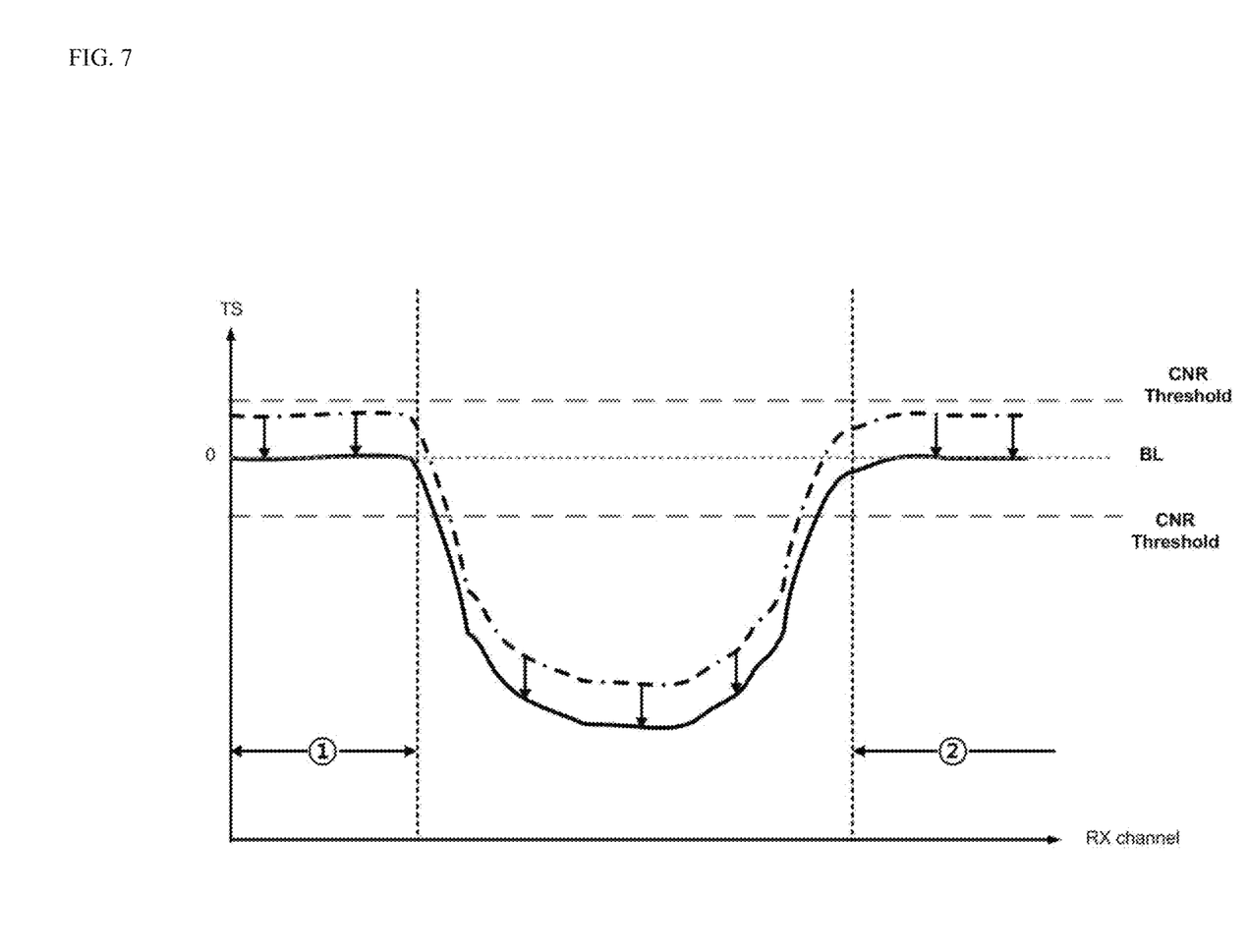

In S500, the influence of common noise is removed from TSs using the difference representative value. FIGS. 6 and 7 are diagrams illustrating removal of common noise. Referring to FIGS. 6 and 7, even in areas ① and ② in which no touch has been made, a TS curve indicated by a dot-and-dash line is neither base lines BL nor values close to the base lines BL. The TSs of the areas ① and ② are separated from the base lines BL by similar distances in a CNR threshold area, and thus may be determined to have been affected by common noise which affects all the sensors. In other words, it is possible to determine that common noise has affected all the sensors to the same degree, that is, as much as the differences between the TSs and the reference level.

In this way, when the TSs of all the sensor nodes are moved down and up with reference to 0 level as shown in FIGS. 6 and 7, it is possible to determine that the TSs have been affected by common noise, and the degree of influence may be quantified as a difference representative value. Therefore, by removing influence of the difference representative value from TSs as shown in FIGS. 6 and 7, it is possible to remove or reduce the influence of common noise quantified as the difference representative value as much as possible, so that TSs output by sensor nodes at which no touch has been made may come close to the reference level for calculation of common noise. For example, as shown in the drawings, when the reference level for calculation of common noise is the base line level, the TSs of sensors that have sensed no touch come close to the base lines BL of the sensors after the influence of common noise is removed. Therefore, as mentioned above, it is possible to remove or reduce the influence of common noise quantified as the difference representative value as much as possible, and in an exemplary embodiment, the operation of removing common noise may be performed on a plurality of channels driven by one driving electrode in an identical manner.

By performing signal processing, interpolation, additional filtering, etc. on TSs obtained through the above operations, touch information, such as the TSs and touch coordinates, is extracted (S600).

According to exemplary embodiments of the present invention, it is possible to effectively remove noise which simultaneously affects all sensors from even an in-cell type touch panel, an on-cell type touch panel, and a touch panel with no shielding layer. In addition, since touch information is detected using TSs from which influence of common noise has been removed or reduced as much as possible, the accuracy of detection of touch information can be improved.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of removing common noise, the method comprising:
   acquiring base lines;
   acquiring raw data;
   calculating touch strengths (TSs) using the base lines and the raw data;
   calculating a difference representative value between the TSs and a reference level; and
   removing influence of common noise from the TSs using the difference representative value,
   wherein the calculating of the TSs comprises calculating a difference between a first raw data acquired from a first channel and a first base line acquired from the first channel, such that channel mismatch in the first channel is removed,
   wherein the calculating of the difference representative value comprises determining whether or not the TSs of sensor nodes exceed a common noise reduction (CNR) threshold and calculating the difference representative value using TSs of first sensor nodes not exceeding the CNR threshold without using TSs of second sensor nodes exceeding the CNR threshold, and
   wherein the second sensor nodes having the TSs exceeding the CNR threshold and the first sensor nodes which are used in the calculating of the difference representative value are in the same channel.

2. The method of claim 1, wherein the acquiring of the base lines comprises, when no touch is made, applying a driving signal from a signal source to a touch panel and processing signals output by the touch panel.

3. The method of claim 1, wherein the acquiring of the raw data comprises applying a driving signal from a signal source to a touch panel and processing signals output by the touch panel.

4. The method of claim 2, wherein the processing of the signals output by the touch panel comprises:
   down-converting the signals output by the touch panel;
   accumulating the down-converted signals; and
   calculating an average of accumulation results of a predetermined time.

5. The method of claim 1, wherein the reference level is any one value in a range from 80% to 120% of the base lines.

6. The method of claim 1, wherein the reference level is a base line level.

7. The method of claim 1, wherein the reference level is any one selected from among previously set preparatory reference levels.

8. The method of claim 1, wherein the calculating of the difference representative value comprises:
   calculating differences between the TSs of sensor nodes and the reference level; and
   calculating any one of a minimum value, a maximum value, a median value, a mode value, an arithmetic mean, a geometric average, and a weighted average of the calculated differences.

9. The method of claim 1, wherein the removing of the influence of the common noise is performed on a plurality of channels driven by one driving electrode in an identical manner.

10. A method of detecting touch information, the method comprising:

detecting a touch strength (TS) calculation reference level when there is no touch input;

detecting touch signals;

calculating TSs using the touch signals and the TS calculation reference level;

calculating a difference representative value by calculating a difference between a common noise calculation reference level and the TSs; and removing influence of common noise from the TSs using the difference representative value, wherein the calculating of the TSs comprises calculating a difference between a first touch signal detected from a first channel and a first TS calculation reference level detected from the first channel, such that channel mismatch in the first channel is removed, wherein the calculating of the difference representative value comprises determining whether or not the TSs of sensor nodes exceed a common noise reduction (CNR) threshold and calculating the difference representative value using TSs of first sensor nodes not exceeding the CNR threshold without using TSs of second sensor nodes exceeding the CNR threshold, and wherein the second sensor nodes having the TSs exceeding the CNR threshold and the first sensor nodes which are used in the calculating of the difference representative value are in the same channel.

11. The method of claim 10, wherein the detecting of the TS calculation reference level comprises, when no touch is made, applying a driving signal from a signal source to a touch panel and processing signals output by the touch panel.

12. The method of claim 10, wherein the detecting of the touch signals comprises applying a driving signal from a signal source to a touch panel and processing signals output by the touch panel.

13. The method of claim 11, wherein the processing of the signals output by the touch panel comprises:
    down-converting the signals output by the touch panel;
    accumulating the down-converted signals; and
    calculating an average of accumulation results of a predetermined time.

14. The method of claim 10, wherein the common noise calculation reference level is any one level in a range from 80% to 120% of the TS calculation reference level.

15. The method of claim 10, wherein the common noise calculation reference level is the same as the TS calculation reference level.

16. The method of claim 10, wherein the common noise calculation reference level is any one selected from among previously set preparatory common noise calculation reference levels.

17. The method of claim 10, wherein the calculating of the difference representative value comprises:
    calculating differences between the TSs calculated according to sensors and the common noise calculation reference level; and
    calculating any one of a minimum value, a maximum value, a median value, a mode value, an arithmetic mean, a weighted average, and a geometric average of the calculated differences.

18. The method of claim 10, wherein the removing of the influence of the common noise from the TSs is performed on a plurality of channels driven by one driving electrode in an identical manner.

* * * * *